United States Patent [19]

Telesio

[11] 4,231,444
[45] Nov. 4, 1980

[54] MECHANICAL INTERFACES FOR CONTROL LINKAGES IN A REMOVABLE VEHICLE ENGINE MODULE

[76] Inventor: George O. Telesio, 7709 S. Milna Ave., Whittier, Calif. 90601

[21] Appl. No.: 937,108

[22] Filed: Aug. 28, 1978

[51] Int. Cl.³ .............................................. B60K 5/10
[52] U.S. Cl. .................................................. 180/294
[58] Field of Search ........................ 180/294, 298, 293

[56] References Cited

U.S. PATENT DOCUMENTS

| | | | |
|---|---|---|---|
| 1,126,592 | 1/1915 | Twombly | 180/294 |
| 2,395,769 | 2/1946 | Thornton | 180/294 |
| 3,783,964 | 1/1974 | Telesio | 180/294 |

FOREIGN PATENT DOCUMENTS 553185  5/1943  United Kingdom ..................... 180/294

*Primary Examiner*—John J. Love
*Assistant Examiner*—Milton L. Smith
*Attorney, Agent, or Firm*—Christie, Parker & Hale

[57] ABSTRACT

A vehicle, such as a refuse collection vehicle, includes an engine and a transmission which are coupled to the vehicle chassis via a pallet-like structural support. Associated with the engine are suitable control linkages, including an accelerator control linkage and a transmission shift linkage. The engine support is mounted to the frame for substantially linear movement into and out of an operative position in which the engine is connected to the vehicle drive shaft; this movement capability includes the capability for movement of the support entirely out of the vehicle frame. An operator's station is mounted to the frame and includes actuators for the accelerator and transmission shift linkages. To facilitate ready removal or substitution of an engine and its support from the vehicle, mechanical couplings are provided in the accelerator and transmission shift linkages in association with the operative position of the engine support. These couplings are configured for automatically dissociating, upon movement of an engine support out of its operative position in the vehicle, and for automatically operatively associating, upon movement of the support into its operative position.

7 Claims, 7 Drawing Figures

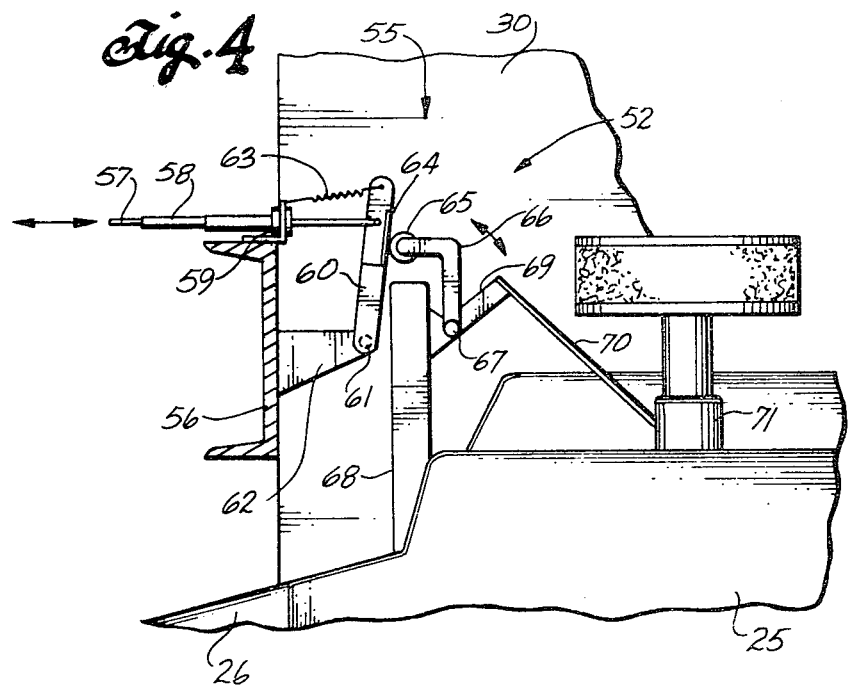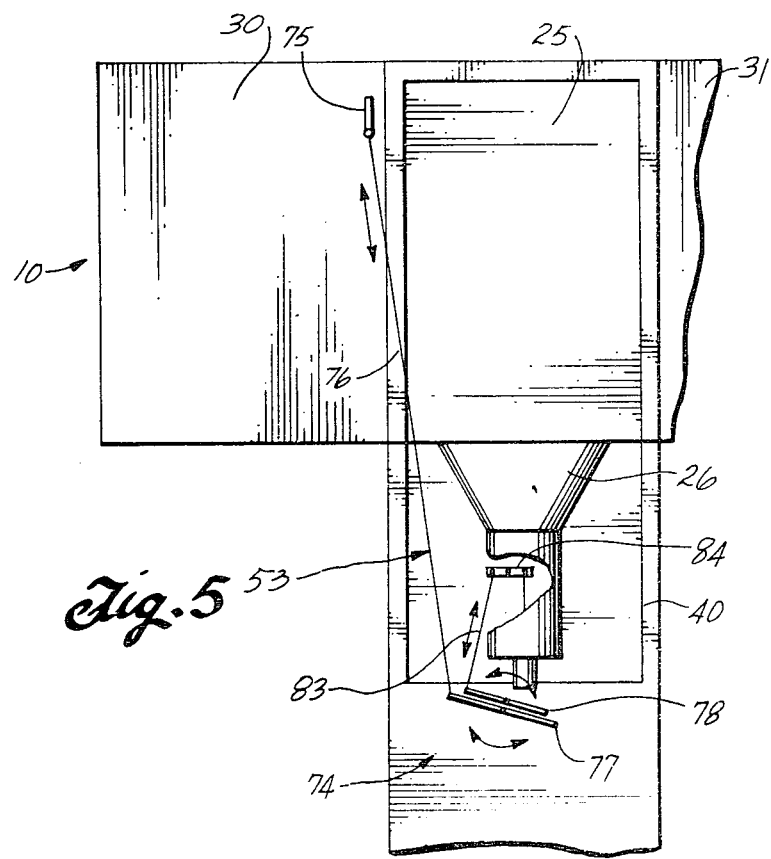

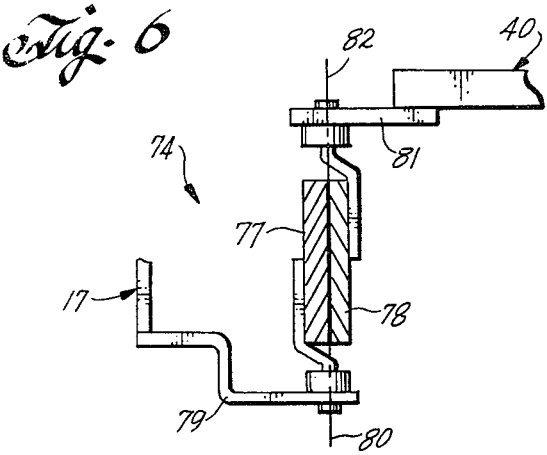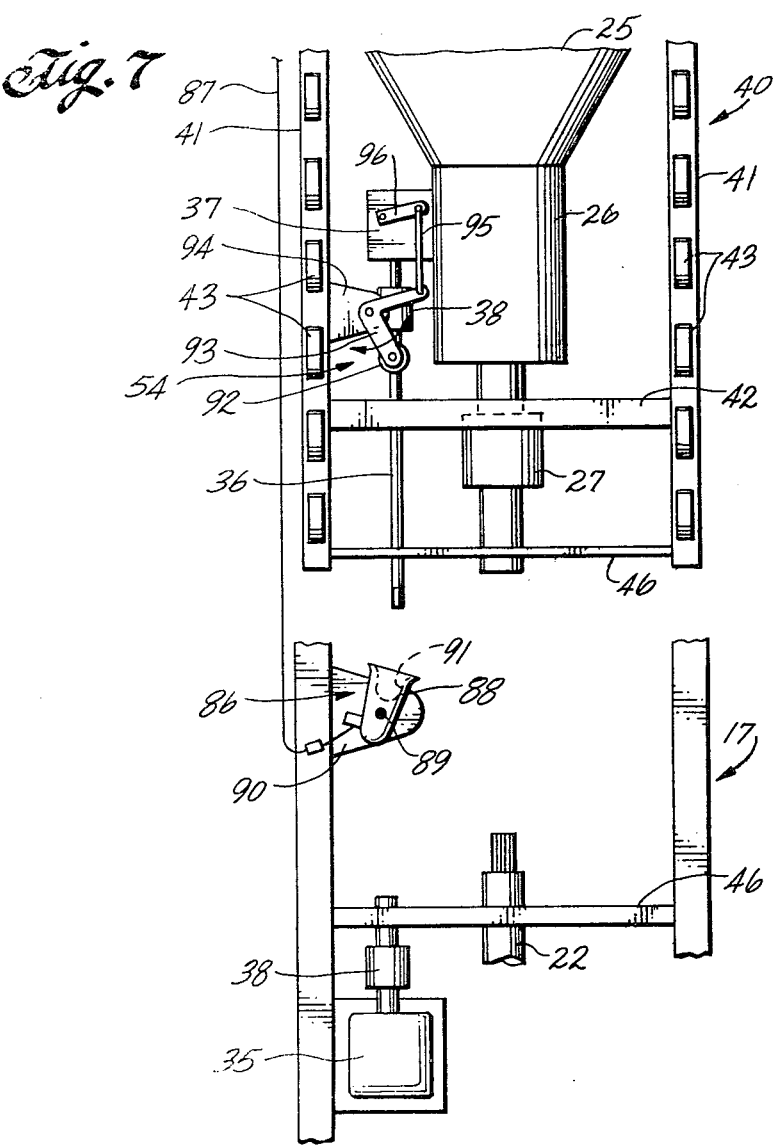

MECHANICAL INTERFACES FOR CONTROL LINKAGES IN A REMOVABLE VEHICLE ENGINE MODULE

INCORPORATION BY REFERENCE

The drawings and descriptions, but not the claims, of U.S. Pat. No. 3,783,964, issued Jan. 8, 1974, are incorporated herein as though fully set forth at this point. U.S. Pat. No. 3,783,964 is sometimes referred to herein as "the referenced patent".

BACKGROUND OF THE INVENTION

1. Field of the Invention

This invention pertains to vehicles. More particularly, it pertains to vehicles in which the propulsion engine is provided as a module which is readily removable from the vehicle for the purposes of changing engines, as in the case of an engine breakdown or malfunction.

2. Description of the Prior Art

My prior U.S. Pat. No. 3,783,964, the referenced patent, describes my earlier invention pertaining to vehicles having removable engine modules. The basic motivations for and purposes and advantages of such vehicles are described extensively in the introductory portions of the referenced patent and are not here repeated in detail. It is sufficient to note that, when a vehicle, particularly a commercial vehicle such as a refuse truck, bus or other heavy duty vehicle, is constructed so that the engine is provided as a module which is readily removable from the vehicle chassis, substantial advantages and economies in vehicle maintenance and operation are achieved. It is my experience that these advantages and economies are maximized where the engine module is removable from the vehicle at an end of the vehicle. In the referenced patent, these benefits are described in the context of a refuse collection truck having an engine module which is removable through the front end of the vehicle.

In any automotive vehicle, there are various linkages provided between the engine, the transmission, and the vehicle operator's station. Such linkages typically include an accelerator linkage coupled between an accelerator pedal at the operator's station and the carburetor or other suitable control mechanism of the engine. Another typical linkage is the gear shift linkage which is provided between the operator's station and the transmission of the vehicle. The transmission typically is intimately associated with the engine sufficiently that it, at least for the purposes of the present invention, may be considered as an element of and removable with the engine from the vehicle chassis. Depending upon the intended use of the vehicle, a power take-off may be provided as a feature of the transmission. If provided, the power take-off has associated with it a suitable control linkage which is preferably operable from the operator's station for causing the power take-off to be engaged or disengaged. These linkages preferably are mechanical for maximum reliability and effectiveness, although it is known to provide hydraulic or pneumatic linkages in certain circumstances.

This invention is concerned principally with vehicles wherein the linkages between the engine and the vehicle operator's control station are of a mechanical nature.

As noted in the referenced patent, upon removal of the engine module from the vehicle for the purposes of servicing the engine-transmission combination, or for rapidly reinstating a vehicle to a condition of service in the event of a malfunction of the engine, the hydraulic, pneumatic and mechanical connections between the engine and the remainder of the vehicle must be disconnected at least prior to removal of the engine from the vehicle chassis. Where there are mechanical linkages between the engine and the remainder of the vehicle, these linkages must be disconnected before the engine can be moved out of its operative position in the vehicle chassis. It is the problems associated with disconnection and reconnection of these mechanical linkages to which this invention is addressed.

A principal objective of a removable engine module is to enable an engine module to be removed from and inserted into operative position in the vehicle chassis as quickly as possible. The need to manually disconnect mechanical linkages, as by pulling of pins, unthreading of screws or the like, consumes time. The nature of the mechanical linkages between the engine and the vehicle control station may result in the point at which the disconnection is to be made being located at a relatively inaccessible place. The more difficult the access to the location where a mechanical connection is to be made or unmade by manual activity, the more likely that the operation will be performed inefficiently or with possible loss, as by dropping, of removable parts.

I have therefore discerned a need to provide, in vehicles having mechanical control couplings between a removable engine module and an operator's station, an arrangement for automatically dissociating and associating connections in the mechanical control linkages as the engine module is moved out of and into its operative position in the vehicle. Effective fulfillment of this need will result in enhanced reliability and efficiency in the engine change operation, and thereby contribute substantially to the fulfillment of the basic objective of the removable engine module. However, the arrangement selected to enable automatic association and dissociation of the mechanical control linkages must be very reliable so that, when the vehicle is in use, the appropriate control functions desired by the vehicle operator are effectively and reliably communicated to the engine.

SUMMARY OF THE INVENTION

This invention fulfills the need identified above. That is, in the context of vehicles having removable engine modules and mechanical linkages between the engine and the vehicle control station, this invention provides simple, effective, efficient and reliable linkage couplings which are operative to automatically dissociate upon movement of the engine module out of its operative position in the vehicle, and for automatically operatively associating upon movement of the module into its operative position in the vehicle. No manual operations are necessary upon the linkages themselves in order to enable an engine module to be removed from its operative position in the vehicle. As an engine module is moved into its operative position, the mechanical control linkages are automatically engaged in a reliable manner. In effect, all that is required, upon insertion of an engine module into its proper operative position in the vehicle, is to mechanically secure the module from movement relative to the vehicle chassis, and to make, preferably by way of quick-disconnect couplings, such connections as are required in such fuel, hydraulic or pneumatic lines as may be associated with the engine.

Generally speaking, this invention provides a vehicle which comprises a chassis. The chassis includes a frame, drivable ground-engaging traction means (such as wheels) mounted to the frame, and drive means coupled to the traction means and connectible to an engine for driving the traction means in response to operation of the engine. The vehicle also includes an engine, a transmission, and a support for the engine and the transmission. The engine includes an accelerator control linkage and the transmission includes a shift linkage. The engine support is mounted to the frame for substantially linear movement of the support into and out of an operative position in which the engine and the transmission are connected to the drive means. An operator's control station is mounted to the frame and includes actuators for the accelerator linkage and the transmission shift linkage. The actuators are operable by a vehicle operator to direct and control, via the linkages, the operation of the engine and the transmission. Mechanical couplings are provided in the linkages in association with the operative position of the support in the frame for automatically dissociating upon movement of the support out of its operative position, and for automatically operatively associating upon movement of the support into its operative position.

DESCRIPTION OF THE DRAWINGS

The above-mentioned and other features of this invention are more fully set forth in the following detailed description of presently preferred embodiments of the invention, which description is presented with reference to the accompanying drawings, wherein:

FIG. 4 is a fragmentary elevation view of the motion-transmitting coupling associated with the accelerator control linkage of the vehicle;

FIG. 5 is a schematic representation of the motion-transmitting coupling associated with the transmission shift control linkage;

FIG. 6 is a fragmentary side elevation view of the coupling encountered in the linkage represented in FIG. 5; and FIG. 7 is a simplified plan view of the coupling associated with a power take-off control linkage in the vehicle shown in FIG. 1.

DESCRIPTION OF THE ILLUSTRATED EMBODIMENTS

Figure 1:
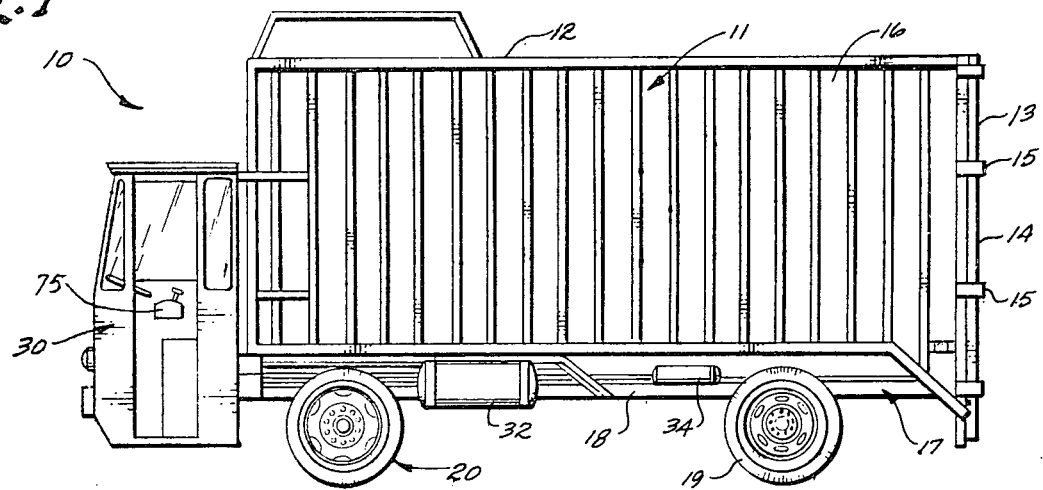
FIG. 1 is a side elevation view of a refuse collection vehicle equipped with the advances according to this invention.

A refuse collection truck 10, as shown in FIG. 1, provides the presently preferred embodiment of a vehicle according to this invention. Truck 10 includes a refuse storage bin 11 which has a generally open top 12 and a selectively openable rear end 13 which is closed by a pair of doors 14 supported by suitable hinges 15 on the rear edges of side walls 16 of the bin. The bin is supported upon a truck chassis 17, which is shown best in FIG. 2, such figure being a top plan view of the truck with bin 11 removed. Chassis 17 includes an elongate structural frame 18 which is supported upon a rear axle assembly 19 and a front axle assembly 20. The rear axle assembly preferably includes four drive wheels 21 which, broadly, are ground-engaging traction means of the truck. A drive shaft 22 interconnects a differential 24 of the rear axle assembly with a transmission 26 mounted just to the rear of an engine 25 disposed at the front end of truck 10. The drive shaft includes a pair of universal joints 27 disposed one adjacent the rear end of transmission 26 (see FIG. 7) and one adjacent the forward end of differential 24. Front axle assembly 20 includes a pair of steerable wheels 28 and a power steering mechanism 29.

Figure 2:
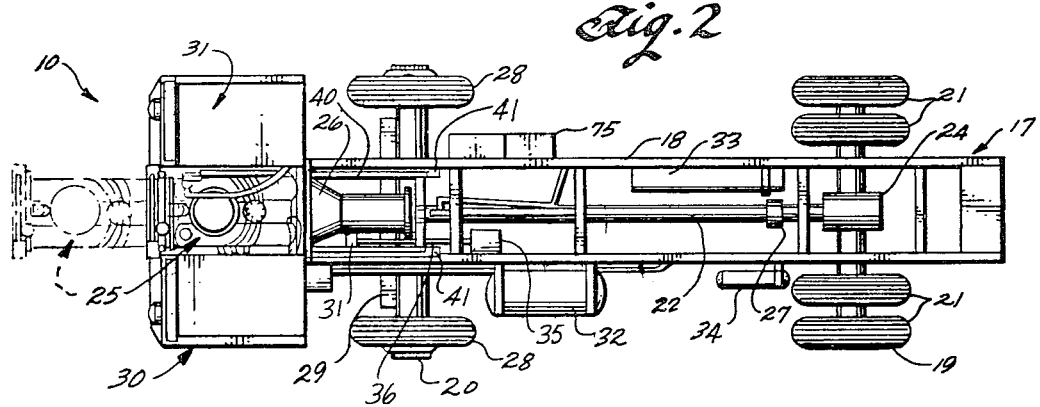
FIG. 2 is a top plan view of the vehicle of FIG. 1 with the refuse storage bin thereof removed.

As shown best in FIG. 2, engine 25 is disposed between a driver's cab 30 and a cab 31 for a crewman of the vehicle. Normally a vehicle of the type illustrated in FIG. 1 is manned by a driver and one crewman.

Vehicle 10 includes a fuel tank 32, a compressed air accumulator 33, a hydraulic fluid reservoir 34, and a hydraulic pump 35, all mounted to vehicle frame 18 at suitable locations. Air accumulator tank 33 is provided in association with pneumatic brakes for the vehicle and receives air from a suitable compressor associated with engine 25 via suitable air hoses connected between tank 33 and the compressor. Hydraulic reservoir 34 and pump 35 are components of a drive mechanism for powering a refuse compactor (not shown) mounted within bin 11. Pump 35 is driven by a power take-off shaft 36 which is connected at its forward end to a power take-off gear box 37 associated with transmission 26. As shown in FIG. 7, the connection of the power take-off shaft to the hydraulic pump and to the power take-off gear box is via a pair of universal joints 38.

Figure 3:
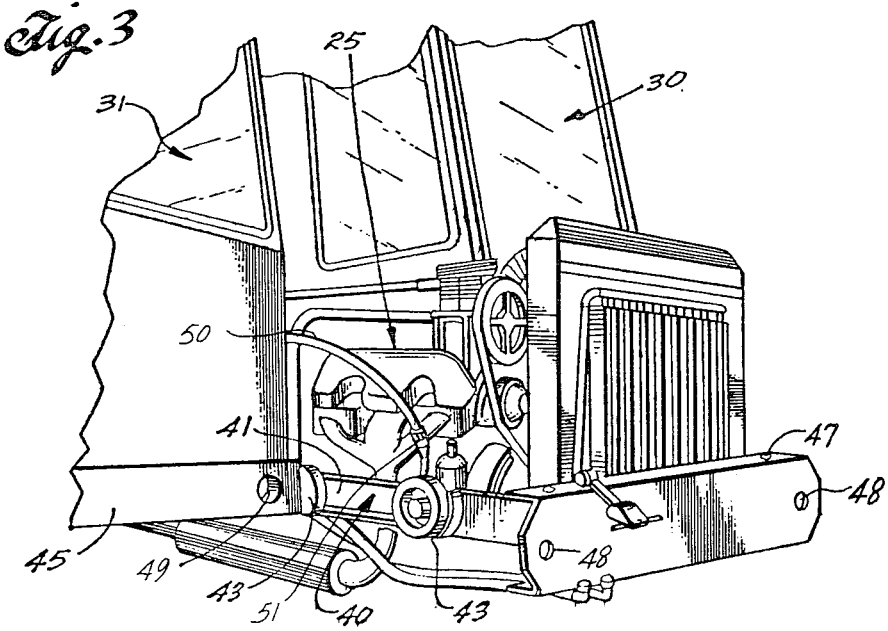
FIG. 3 is a side perspective view of a removable engine module in a partially extended position thereof relative to the vehicle frame.

In truck 10, engine 25 is not mounted directly to frame 18. Rather, engine 25 and transmission 26 are carried by an open structural support 40 which is shown in FIGS. 3 and 7, and of which a central section 39 of the vehicle front bumper forms a transverse forward element. Support 40 also includes a pair of parallel side members 41 and suitable transverse elements including a rear transverse element 42, shown in FIG. 7. A plurality of wheels 43 are connected to support side elements 41 at spaced locations along each side of the support. The wheels cooperate with respective tracks which are fixed to the frame to extend parallel to the centerline of chassis 17. The tracks preferably are provided in the form of lengths of structural channel member which are so disposed in the frame that wheels 43 are positioned between the opposing surfaces of the channel flanges. Ideally, the channels with which wheels 43 cooperate are components of the vehicle frame 18 itself. It is also preferred that the two track members extend to the front end of chassis 17 where each track is connected to the inboard end of a side bumper section 45 disposed across the front of driver cab 30 and crew cab 31, respectively. Support 40 carries the conventional engine mounts by which engine 25 is mounted directly to the support. Transmission 26 is connected to the rear portion of engine 25 for movement with the engine fore and aft relative to chassis 17 in response to movement of the engine support within the chassis. That is, both the engine and the transmission are mounted as a unit in movable support 40.

As shown in FIGS. 2 and 3, engine support 40 is so mounted to chassis 17 that the engine and transmission are movable longitudinally linearly relative to the chassis between a retracted operative position (shown in solid lines in FIG. 2) and an extended position (shown in broken lines in FIG. 2); the extended position of the engine, as shown in FIG. 2, is actually an intermediate position. The cooperation between support 40 and the tracks defined by the vehicle frame is such that the engine support can be removed entirely from the vehicle through the front end of the chassis. The intermediate extended position of the engine (shown in FIG. 2) is useful for routine servicing and minor repairs to the engine by a mechanic or the like. For major overhauls or service projects, it is preferable to entirely remove the engine and the transmission from the vehicle.

As described in detail in the referenced patent, engine 25 is automatically coupled to drive shaft 22 via transmission 26 as the engine support is moved into the retracted operative position of the engine in the vehicle. The same mechanisms 46 used to position the male and female spline components in drive shaft 22 just to the rear of forward drive shaft universal joint 27 (see FIG. 7) are also used to provide proper alignment between the male and female spline components in power take-off shaft 36 just forwardly of the universal joint 38 associated with hydraulic pump 35. Suitable shaft positioning mechanisms 46 are shown in FIGS. 8 and 9 of the referenced patent.

As shown in FIG. 3, front bumper center section 39 preferably is defined by a structural channel member which has its flanges extending rearwardly toward chassis 17, and in which the spacing between the channel flanges is somewhat greater than the height of side bumper sections 45. Also, the center bumper section has a length sufficient that its ends overlap the inner ends of the side bumper sections. When the front bumper section is mated with the side bumper sections, a hole 47 through the upper flange of the center bumper section at each end thereof is registered with vertical holes (not shown) through the side bumper sections; these holes are provided so that, in the retracted position of the engine, drift-lock pins may be engaged between the center and side bumper sections to mechanically lock the forward portion of frame 40 in positive relation to the vehicle chassis. Also, a hole is provided through each end of the web portion of the front bumper section channel to be aligned with a tapped hole 48 provided in the inboard end of each of the side bumper sections. When the engine support is fully retracted in the vehicle chassis, bolts may be engaged in holes 48 and 49 to still further secure the engine support in its retracted position.

When engine 25 is in its operative retracted position in the vehicle frame, there are several hoses connected from the engine to other components of the vehicle. One of these hoses 50, a fuel hose, is shown in FIG. 3. This hose is connected to the engine via a commercially available self-sealing, quick-disconnect fitting 51. Similar hoses (not shown) for compressed air and for power steering hydraulic fluid are also equipped with self-sealing, quick-disconnect couplings adjacent the engine. Preferably, the quick-disconnect fittings for the several hoses associated with the engine are located toward the forward portion of the engine so that they are accessible for connection and disconnection when the engine support is in its partially extended position as shown in FIG. 3.

In truck 10, there are three mechanical control linkages which are effectively coupled between the vehicle operator cab 30 and the engine and transmission when the engine support is in its fully retracted position in frame 18. These control linkages are an accelerator-throttle linkage 52 (see FIG. 4), a gear shift linkage 53 (see FIG. 5), and a power take-off control linkage 54 (see FIG. 7). These linkages traverse the interface between the movable engine support and the vehicle frame. At about the location where each linkage traverses this interface, the linkage includes a coupling which is so arranged that, as the support is moved out of its fully retracted position in the frame, the coupling is automatically dissociated or disconnected, and so that, as the support is moved into its fully retracted position, the coupling is automatically engaged for effective operation of the pertinent mechanism under the control of an operator located in cab 30. These couplings do not require that any manual operations be performed upon them in order that they may be connected or reconnected. These characteristics of the couplings enable an engine module, composed of support 40 and an engine and transmission carried thereon, to be rapidly removed from the vehicle and, if desired, a substitute module inserted in its place. Because the linkages are configured for automatic connection and disconnection in response to movement of the engine support out of and into its fully retracted position, the locations at which the several control linkages traverse the interface between the vehicle chassis and the engine module can be, and preferably are, located toward the rear of the module at locations where they are not normally accessible.

As shown in FIG. 4, an automatically engageable and disengageable coupling 55 is provided in accelerator-throttle control linkage 52. A beam 56 traverses the engine compartment between personnel cabs 30 and 31 at the rear of the cabs. Accelerator control signals for engine 25 are originated by the vehicle operator by depressing a conventional accelerator pedal (not shown) located in control cab 30. The accelerator pedal is connected to a push-pull flexible cable which has an axially movable core 57 and a flexible protective sheath 58. The control cable extends from one end at the accelerator pedal to its other end which is mounted to beam 56 by a suitable anchor structure 59 which serves as a terminus for sheath 58. The axially movable core of the cable extends through the anchor structure to a pivotal connection with the upper end of a cam lever 60 which has its lower end pivoted at 61 to a bracket 62 which extends forwardly from beam 56. A spring 63 is coupled between the upper end of the cam lever and anchor structure 59 to urge the cam lever toward the anchor structure. The cam lever has a laterally extending lug which defines a forward camming face 64 on the lever.

A cam follower roller 65 is rotatably mounted on one end of an arm 66, the other end of which is secured to a transverse shaft 67 which is pivotably mounted in suitable brackets connected to a post 68 connected either to engine 25 or, if desired, to engine support 40. A second arm 69 is connected to shaft 67; arm 69 is connected to a rigid throttle actuator rod 70. The end of rod 70 opposite from arm 69 is coupled to the conventional carburetor throttle mechanism 71 which is itself spring-loaded in such a manner that cam follower support arm 66 is always urged to move counterclockwise about the axis of shaft 67 and into engagement of cam roller 65 with cam face 64 on lever 60.

The geometry of the structure described above and shown in FIG. 4 is adjusted so that, when the engine is in its operative position and the accelerator pedal of the vehicle is not depressed, the nature of the engagement of the cam roller with lever camming face 64 is such as to operate the engine throttle into its normal idle position. Depression of the accelerator pedal in the vehicle control cab causes core 57 of the push-pull control cable to be moved in such a manner as to cause cam lever 60 to be rotated clockwise about its pivot 61, which action is transferred to the carburetor by the cooperation of cam roller 65 with camming surface 64. It is therefore seen that, when the engine is in its operative position, coupling 55 is fully effective to cause the carburetor to be operated under the control of the accelerator pedal in the same manner as though the control cable extended directly to the carburetor. However, as the engine module is moved forwardly in the vehicle chassis out of its operative position, coupling 55 is automatically disengaged as cam roller 65 moves away from the forwardly facing camming surface 64. Conversely, coupling 65 is automatically operatively reassociated as the engine module is moved into its secured position in the vehicle by reengagement of the follower roller with the camming surface.

To facilitate servicing of the engine when the engine module is in its partially extended position shown in FIG. 3, I have found it useful to provide a manual override on those portions of coupling 55 which are carried by the engine module. The override mechanism, which is not shown, preferably has a portion thereof which is accessible at either side of the engine near the forward portion of the module so that a mechanic can operate the engine in the partially extended position of the module while fuel hose 50 is still connected to the engine.

A coupling 74, which automatically associates and dissociates upon movement of engine 40 into and out of its operative position in the vehicle, is shown in FIGS. 5 and 6 (particularly in FIG. 6) as a component of the transmission gear shift control linkage 53. A gear shift control 75 is located in operating cab 30. This control is an actuator for control linkage 53. Operation of control 75 produces reciprocal motion of a rigid connecting rod 76 which is connected between the control and a first one 77 of two coupling plates 77 and 78 which are components of coupling 74. The connection of rod 76 and control 75 preferably is by way of suitable bell cranks and subsidiary rods which are so arranged that there is no lost motion in the effective connection between coupling 77 and control 75. At its rear end, rod 76 is pivoted to one end of coupling plate 77 which is disposed substantially horizontally adjacent the rear end of engine support 40 when the support is in its fully retracted position in chassis 17. Coupling plate 77 is mounted on a bracket 79 which is secured to chassis 17 (see FIG. 6) for rotation about an axis 80. When coupling 74 is engaged, a forward face of coupling plate 77 abuts the rear face of coupling plate 78. Coupling plate 78 is connected at about its midlength to a bracket 81 which is secured to engine support 40 so that coupling plate 78 is rotatable about an axis 82. In the engaged condition of coupling 74, axes 80 and 82 are collinear in the common plane of abutment between plates 77 and 78. That is, axis 80 associated with rear coupling plate 77 lies in the same plane as the forward face of the rear coupling plate at essentially the midlength of the rear coupling plate, and axis 82 lies in the plane of the rear face of forward coupling plate 78 at about the midlength of the forward coupling plate. A connecting rod 83 is connected from one end of the forward coupling plate to a transmission shift lever 84 as represented in FIG. 5. The shift lever is connected to the internal mechanism of transmission 26 in a conventional manner. The transmission preferably is an automatic transmission.

From an inspection of FIG. 5, it will be apparent that linear motion of linkage rod 76 in either direction produces rotation of rear coupling plate 77 about its axis of rotation in either direction, which rotation is followed precisely by forward coupling plate 78 and is transmitted faithfully to transmission shift lever 84 by connecting rod 83.

Since coupling plates 77 and 78 engage each other only in an abutting relation, it is apparent that the coupling plates readily separate from and reengage with each other as engine support 40 is moved out of and into its fully retracted operative position in chassis 17. Axis 80 has a fixed location relative to the vehicle chassis, whereas axis 82 has a fixed location relative to the engine support.

A coupling 86 is provided in power take-off control linkage 54 (see FIG. 7) for automatic engagement and disengagement as engine support 40 moves into and out of its fully retracted position in chassis 17. Power take-off control linkage includes a push-pull control cable 87 which has one end thereof connected to a suitable actuator located in control cab 30 and which has its other end connected to a cam shoe 88. The cam shoe is pivoted at 89 to a suitable bracket 90 secured to chassis 17 above and to the rear of the location occupied by power take-off gear box 37 when the engine module is in its secured position in the vehicle. Operation of the power take-off actuator in the vehicle control cab is transmitted to cam shoe 88 via push-pull control cable 87 to cause the cam shoe to pivot about axis 89. As shown in FIG. 8, the forward end of cam shoe 88 defines a forwardly open recess 91 into which is receivable a follower roller 92 rotatably mounted on a rearwardly extending arm of a bell crank 93 which is pivotally mounted to engine support 40 via a suitable bracket 94. Bell crank 93 is in turn coupled by a connecting rod 95 to a power take-off operator lever 96, the motion of which causes power take-off gear box to be shifted between its engaged and disengaged states. When the power take-off gear box is in its engaged state, power take-off shaft 36 is rotated in response to operation of engine 25.

As shown in FIG. 7, a forward portion of cam follower recess 91 in cam shoe 88 is flared to assure that follower roller 92 is guided into proper registry with the cam shoe as an engine module is moved into its secured position in vehicle chassis 17. Once the follower roller has properly seated in recess 91, motion of the cam shoe in either direction about its pivot axis 89 produces corresponding motion of the power take-off operating lever 96 via the mechanical linkage provided by bell crank 93 and connecting rod 95. It will be apparent that the components of coupling 86 mounted to the vehicle chassis and the engine support, respectively, automatically engage and disengage from each other as the engine support is moved into and out of its fully retracted position in the vehicle.

From the foregoing, it will be apparent that the style of coupling 74 provided in the transmission shift control linkage could be used, if desired, as the automatically engageable and disengageable coupling in the power take-off control linkage. Conversely, if desired, it is apparent that the style of coupling provided in the power take-off control linkage could be used in transmission shift control linkage 53 in lieu of coupling 74.

From the foregoing description, it is apparent that this invention fulfills the need identified above. That is, it enables one to retain all of the advantages of a retractable and removable engine module, as described in my prior patent, in instances where the control linkages between the vehicle control station and the engine and the transmission, located on the removable engine carrier, are of a mechanical nature rather than a hydraulic, pneumatic or electrical nature. The automatically engageable and disengageable couplings provided in the mechanical control linkages are safe, simple, efficient and reliable, and do not require any manual attention.

Person skilled in the art to which this invention pertains will appreciate that the preceding description of this invention has been presented with reference to a single illustrated embodiment of the invention. The described embodiment is the embodiment which is presently preferred. It will be understood, however, that the present invention can be manifested in embodiments different from the described presently preferred embodiment. Thus, the preceding description sets forth the presently known best mode of practicing this invention, but certainly not all possible modes. Accordingly, workers skilled in the art to which this invention pertains will readily appreciate that modifications, alterations or variations in the arrangements and procedures described may be practiced without departing from, and while still relying upon, the essential aspects of this invention.

What is claimed is:

1. A vehicle comprising
   (a) a chassis including a frame, drivable ground engaging traction means mounted to the frame, and drive means coupled to the traction means and connectible to an engine for driving the traction means in response to operation of the engine,
   (b) an engine, a transmission, and a support for the engine and the transmission, the engine including an accelerator control linkage and the transmission including a shift linkage,
   (c) means mounting the engine support to the frame for substantially linear movement of the support into and out of an operative position in which the engine is connected to the drive means,
   (d) an operator's station mounted to the frame and including an accelerator linkage actuator and a transmission linkage actuator, the actuators being operable by a vehicle operator to direct and control via the linkages the operation of the engine and the transmission, and
   (e) mechanical couplings in the linkages in association with the operative position of the support for automatically dissociating upon movement of the support out of its operative position and for automatically operatively associating upon movement of the support into its operative position, the coupling in the transmission shift linkage including means for positively following and transmitting in a push-pull manner to the transmission motion of the transmission linkage actuator.

2. A vehicle comprising
   (a) a chassis including a frame, drivable ground engaging traction means mounted to the frame, and drive means coupled to the traction means and connectible to an engine for driving the traction means in response to operation of the engine,
   (b) an engine, a transmission, and a support for the engine and the transmission, the engine including an accelerator control linkage and the transmission including a shift linkage,
   (c) means mounting the engine support to the frame for substantially linear movement of the support into and out of an operative position in which the engine is connected to the drive means,
   (d) an operator's station mounted to the frame and including an accelerator linkage actuator and a transmission linkage actuator, the actuators being operable by a vehicle operator to direct and control via the linkages the operation of the engine and the transmission, and
   (e) mechanical couplings in the linkages in association with the operative position of the support for automatically dissociating upon movement of the support out of its operative position and for automatically operatively associating upon movement of the support into its operative position,
   (f) one of the couplings comprising first and second coupling plates having opposing faces abuttable with each other, the plates having a normal position in an unactuated state of the linkage in which the plate abuttable faces are disposed substantially normal to the support line of movement, means mounting the first plate to the chassis for rotation about a first axis disposed substantially in the abuttable surface of the first plate, and means mounting the second plate to the support for rotation about a second axis disposed substantially in the abuttable surface of the second plate, the first and second axes being substantially collinear in the operative position of the support, the linkage of which the one coupling is a component including connecting means connecting the linkage actuator and the first plate and the second plate and mechanism controlled by the linkage.

3. A vehicle according to claim 2 wherein the plates are elongated, and the axes are disposed to traverse the elongate extents of the respective plates at substantially the midlength of the respective plate.

4. A vehicle according to claim 3 wherein the connecting means are connected to the respective plates at a location on the plate spaced from the plate pivot axis.

5. A vehicle according to claim 2 wherein said one coupling is a component of the transmission shift linkage.

6. A vehicle comprising
   (a) a chassis including a frame, drivable ground engaging traction means mounted to the frame, and drive means coupled to the traction means and connectible to an engine for driving the traction means in response to operation of the engine,
   (b) an engine, a transmission, and a support for the engine and the transmission, the engine including an accelerator control linkage and the transmission including a shift linkage,
   (c) means mounting the engine support to the frame for substantially linear movement of the support into and out of an operative position in which the engine is connected to the drive means,
   (d) an operator's station mounted to the frame and including an accelerator linkage actuator and a transmission linkage actuator, the actuators being operable by a vehicle operator to direct and control via the linkages the operation of the engine and the transmission, and
   (e) mechanical couplings in the linkages in association with the operative position of the support for automatically dissociating upon movement of the support out of its operative position and for automatically operatively associating upon movement of the support into its operative position, (f) one of the couplings comprising a member pivoted to one of the chassis and the support and defining a recess opening toward the other of the chassis and the support substantially along the line of movement of the support, a follower roller carried by an arm pivotally mounted to the other of the chassis and the support and engageable in the recess when the support is in its operative position sufficiently intimately that pivotal motion of one of the member and the arm is productive of pivotal motion of the other.

7. A vehicle according to claim 6 wherein the transmission includes a power take-off mechanism and a control linkage operable for controlling the operation thereof, and wherein the one coupling is a component of the power take-off control linkage.

* * * * *